C. HAMMOND.
SPOON SUPPORTER.
APPLICATION FILED DEC. 26, 1914.
1,196,737.
Patented Aug. 29, 1916.
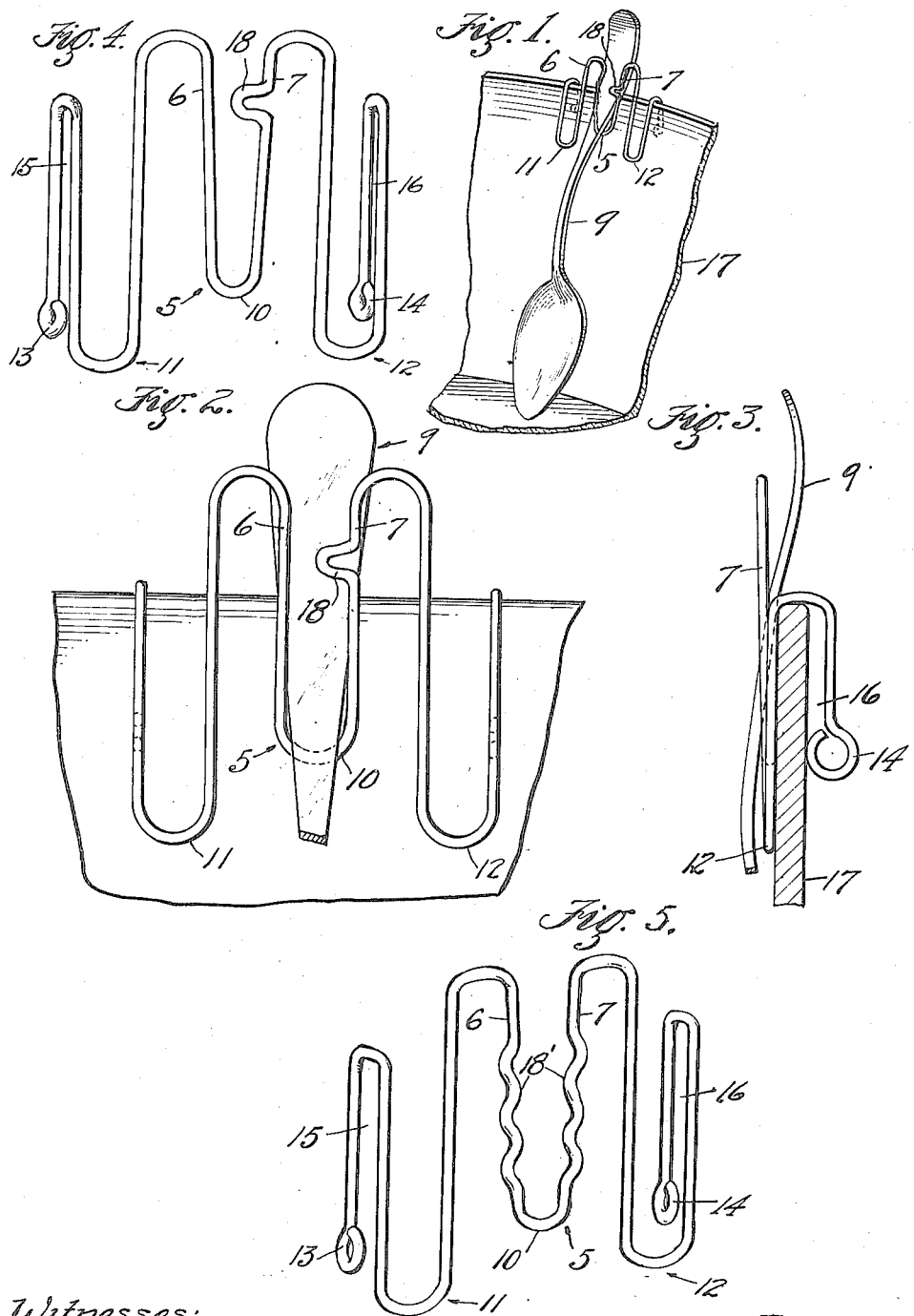
Witnesses:—
James M. Abbett
Marguerite Bates.
Inventor,
Charles Hammond.
By
Attys.

UNITED STATES PATENT OFFICE.

CHARLES HAMMOND, OF EL MONTE, CALIFORNIA.

SPOON-SUPPORTER.

1,196,737.  Specification of Letters Patent.  Patented Aug. 29, 1916.

Application filed December 26, 1914. Serial No. 879,081.

*To all whom it may concern:*

Be it known that I, CHARLES HAMMOND, a citizen of the United States, residing at El Monte, in the county of Los Angeles, State of California, have invented new and useful Improvements in Spoon-Supporters, of which the following is a specification.

This invention relates to a spoon supporter.

It is the object of this invention to provide a device which is adapted to be applied to the edge of a bowl or other utensil for the purpose of engaging the handle of a spoon or similar implement to support same.

Another object is to provide a spoon supporter which is so designed that it may be constructed of a single strand of wire and which, by reason of its flexibility, may be adjusted to utensils and implements of various shapes and sizes.

Another object is to provide a means for engaging and supporting a spoon so constructed that the spoon can be easily and quickly placed thereon and removed therefrom.

A further object is to provide a device of the above character which can be readily applied to a dish or other utensil and securely supported thereon, and which can be easily removed and replaced.

The invention is illustrated in the accompanying drawings, in which:

Figure 1 is a perspective view illustrating a bowl with portions broken away, showing the invention as applied. Fig. 2 is a view of the supporter in front elevation, illustrating the manner of engaging a spoon thereby. Fig. 3 is an edge view illustrating the manner of applying the supporter to the edge of a dish. Fig. 4 is a view of the supporter in perspective. Fig. 5 is a perspective view of a modified form of the supporter.

In carrying out the present invention a single strand of wire is preferably employed, which is bent intermediate its ends to form a U-shaped member 5, the limbs 6 and 7 of which are adapted to extend on each side of the handle 9 of a spoon or other implement, as particularly shown in Figs. 1 and 2. The connecting portion 10 of the U-shaped spoon-engaging member 5 is sufficiently resilient to tension the limbs 6 and 7, so that the latter will form resilient or yieldable implement-engaging jaws, but which is also flexible to permit the limbs 6 and 7 being adjusted in such spaced relation to each other as to accommodate handles 9 of various sizes.

The outer ends of the limbs 6 and 7 are bent in opposite directions and are turned downwardly and thence upwardly to form U-shaped tongues 11 and 12 on opposite sides of the implement-engaging member 5; the outer limbs of the U-shaped tongues 11 and 12 being bent rearwardly and thence downwardly, and terminating in eyelets 13 and 14 to form spring clips 15 and 16, adapted to receive the upper edge of a bowl 17 or other utensil, as particularly shown in Fig. 3.

One of the limbs of the U-shaped member 5 is bent adjacent its upper end to form an inwardly-extending projection 18, which is positioned at a point slightly above the ends of the clips 15 and 16, so that when the latter engage the edge of the bowl 17, the projection 18 will be disposed near the edge of the bowl. When the spoon handle 9 is interposed between the limbs of the U-shaped member 5, the projection 18 extending in front of the spoon handle coöperates with the edge of the bowl to hold the spoon handle flat against the bowl and prevent twisting movement. The bowl 17 may be freely moved without disengaging the spoon from the supporter or permitting the spoon to swing about in the bowl.

In the application of the invention, the spring clip portions 15 and 16 of the device are placed over the upper edge of the bowl or utensil 17, with the tongues 11 and 12 and the implement-engaging member 5 extending on the inner face of the bowl, as particularly shown in Fig. 2. The handle 9 of the spoon or other implement is then inserted edgewise between the resilient jaw members formed by the limbs 6 and 7, and then turned to position it beneath the projection 18.

In the modified form of the invention illustrated in Fig. 5, the limbs 6 and 7 of the U-shaped member 5 are formed with serrations, the inwardly-projecting portions 18′ of which are arranged opposite each other and are adapted to extend over and engage the outer face of the spoon handle 9.

In placing the handle 9 in position, the upper portions of the limbs 6 and 7 will be pressed outwardly so that a pair of opposing projections 18′ between the serrations will extend over the opposite edges of the handle 9 to clamp the latter against the edge of the bowl 17. By this arrangement the spoon or other implement will be held against displacement on the edge of the bowl.

What I claim is:

A spoon holder for a container formed of a single strand of wire bent at its center to form a spoon holding bight to abut the inside of said container having an inwardly bent projection in one leg thereof disposed above the upper edge of said container for retaining a spoon, bent backwardly substantially parallel to the legs of said bight, bent backwardly parallel to itself to form bights, providing a pair of clamping legs to abut the inside of said container and disposed on opposite sides of said spoon holding bight, and bent backwardly parallel to itself at the ends to form a second pair of clamping legs to abut the outside of said receptacle.

In witness that I claim the foregoing I have hereunto subscribed my name this 14th day of December, 1914.

CHAS. HAMMOND.

Witnesses:
HENRIETTA E. WORKMAN,
MARGUERITE BATES.